United States Patent
Fernald et al.

(10) Patent No.: US 11,226,704 B2
(45) Date of Patent: Jan. 18, 2022

(54) PROJECTION-BASED USER INTERFACE

(71) Applicant: Sony Group Corporation, Toyko (JP)

(72) Inventors: Royce Fernald, Portland, OR (US);
Kedar A. Dongre, Hillsboro, OR (US)

(73) Assignee: Sony Group Corporation, Tokyo (JP)

( * ) Notice: Subject to any disclaimer, the term of this patent is extended or adjusted under 35 U.S.C. 154(b) by 121 days.

(21) Appl. No.: 15/279,989

(22) Filed: Sep. 29, 2016

(65) Prior Publication Data

US 2018/0088740 A1 Mar. 29, 2018

(51) Int. Cl.
*G06F 3/041* (2006.01)
*G06F 3/042* (2006.01)
*H04N 9/31* (2006.01)
*G06T 7/70* (2017.01)
*G06T 1/00* (2006.01)

(52) U.S. Cl.
CPC .......... *G06F 3/0418* (2013.01); *G06F 3/0425* (2013.01); *G06F 3/0428* (2013.01); *G06T 1/0064* (2013.01); *G06T 7/70* (2017.01); *H04N 9/3179* (2013.01); *H04N 9/3194* (2013.01); *G06T 2201/0601* (2013.01); *G06T 2207/10024* (2013.01); *G06T 2207/10028* (2013.01); *G06T 2207/30196* (2013.01); *G06T 2207/30204* (2013.01)

(58) Field of Classification Search
None
See application file for complete search history.

(56) References Cited

U.S. PATENT DOCUMENTS

| | | | |
|---|---|---|---|
| 6,512,838 B1 | 1/2003 | Rafii et al. | |
| 6,803,906 B1 * | 10/2004 | Morrison | G06F 3/0428 178/18.01 |
| 8,818,027 B2 * | 8/2014 | Forutanpour | G06F 3/0418 382/103 |
| 2003/0132950 A1 * | 7/2003 | Surucu | G06F 1/1626 715/700 |
| 2010/0231522 A1 | 9/2010 | Li | |
| 2013/0057515 A1 * | 3/2013 | Wilson | G06F 3/0425 345/175 |

(Continued)

OTHER PUBLICATIONS

Art, Rossman, "How to Produce Invisible Digital Watermarking in Photoshop Without a Plug-in", www.rossmanart.com, Oct. 2, 2014, 6 pages, USA.

(Continued)

*Primary Examiner* — Andre L Matthews
(74) *Attorney, Agent, or Firm* — Michael Best & Friedrich LLP

(57) ABSTRACT

Techniques for providing a virtual touch screen are described. An example of a computing device with a virtual touch screen includes a projector to project a user interface image and a depth camera to detect objects in the vicinity of the user interface image. The computing device also includes a touch service that receives image data from the depth camera and analyzes the image data to generate touch event data. The computing device also includes a User Input (UI) device driver that receives the touch event data from the touch service and reports the touch event data to an operating system of the computing device. The touch service and UI device driver are system level software that is operable prior to a user logging onto the computing device.

19 Claims, 9 Drawing Sheets

(56) References Cited

U.S. PATENT DOCUMENTS

| | | | | |
|---|---|---|---|---|
| 2013/0307949 | A1* | 11/2013 | Zhang | G06F 3/042 348/61 |
| 2014/0313363 | A1* | 10/2014 | Chiu | G06F 3/0425 348/222.1 |
| 2015/0179147 | A1* | 6/2015 | Rezaiifar | G06F 3/011 345/625 |
| 2015/0199101 | A1 | 7/2015 | Hwang et al. | |
| 2015/0253864 | A1 | 9/2015 | Parkhomenko et al. | |
| 2015/0286333 | A1* | 10/2015 | Shey | G06T 11/001 345/173 |
| 2016/0299569 | A1* | 10/2016 | Fisher et al. | G06F 3/017 |
| 2016/0378251 | A1 | 12/2016 | Aznoe | |
| 2017/0316594 | A1* | 11/2017 | Tan | H04N 9/3179 |

OTHER PUBLICATIONS wikipedia.com, "Homography", https://en.wikipedia.org/wiki/Homography, date viewed Oct. 27, 2016, 9 pages, USA.

wikipedia.com, "Homography (computer vision)", https://en.wikipedia.org/wiki/Homography_(computer_vision), date viewed Oct. 27, 2016, 3 pages, USA.

* cited by examiner

300

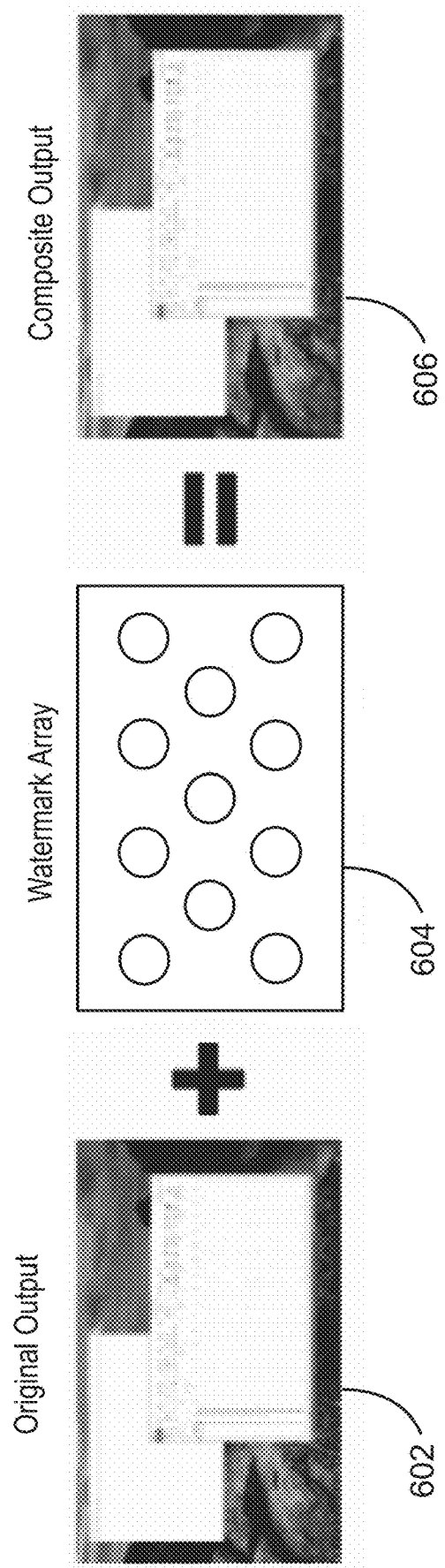

PROJECTION-BASED USER INTERFACE

TECHNICAL FIELD

This disclosure relates generally to techniques for providing a projection-based user interface. The projection-based user interface enables a user to interact with a projected image using a depth camera as a touch sensor.

BACKGROUND

Traditional computing devices rely on physical instrumentation such as a mouse, keyboard, or touch screen to receive user input. A projection-based user interface enables the user to interact with a virtual input device projected onto a surface. For example, a virtual keyboard can be projected onto a tabletop surface and the user can select keys on the virtual keyboard by touching the surface over which the virtual keyboard is being projected. To detect user inputs, a depth sensor can be used to determine the position of a user's fingers relative to the projected display. Receiving user inputs in this way provides a more flexible input mechanism that does not require any surface instrumentation.

BRIEF DESCRIPTION OF DRAWINGS

FIGS. 6A-C are example illustrations of a method of performing continuous calibration of a virtual touch screen device.

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

The subject matter disclosed herein relates to techniques for implementing a projection-based user interface referred to herein as a virtual touch screen device. An example system for providing the projection-based user interface includes a projector and a depth camera. The projector displays the user interface on a surface such as a table top and the depth camera detects the position of the user's hands and fingers. To enable the system to detect touch events, the projection display space is calibrated to the depth camera space to provide a mapping between the projection display coordinates and the depth camera image coordinates. This mapping enables the system to convert the detected touch location to a corresponding display location. The detected touch events are injected into the operating system (OS) to enable all applications to be used without any changes.

One possible mechanism to accomplish calibration and touch injection is to encode these functions at the user level, i.e., after the user has logged onto a device. However, this would prevent the use of the projection-based user interface unless the user is explicitly logged on using a physical device such as a keyboard, mouse, or touchscreen.

The projection-based user interface of present disclosure is provided by a software stack referred to herein as the "projected computing touch framework" or simply "the framework." The framework provides a User Input (UI) device driver that registers a virtual touch screen device with the operating system, thus enabling the operating system to accept user input via touch actions across all interactions screens, including at first time setup, the login window, the lock screen, and others.

The framework also includes graphics driver that is able to override the rendering of the current display content with a calibration pattern at any given time, thus enabling the system to calibrate or recalibrate itself at any time with or without a user being actively logged into the system. The framework also includes a system-level touch service that runs for the entire duration that the computing system is powered-on and in active/awake state and manages the communications between the graphics drivers and the UI device drivers. Thus, the calibration and touch injection functions are provided at the system level rather than the user level. Accordingly, the projection-based user interface is available prior to user login and can be used as the primary input mechanism even for the pre-login first-time setup screen. Thus, a computing platform can be designed without other peripheral user input devices such as the keyboard, mouse, touch screen, or input device. The framework also enables movable and/or resizable interactive surfaces and simplifies manufacturing by eliminating factory testing of projector and camera alignment.

Figure 1:
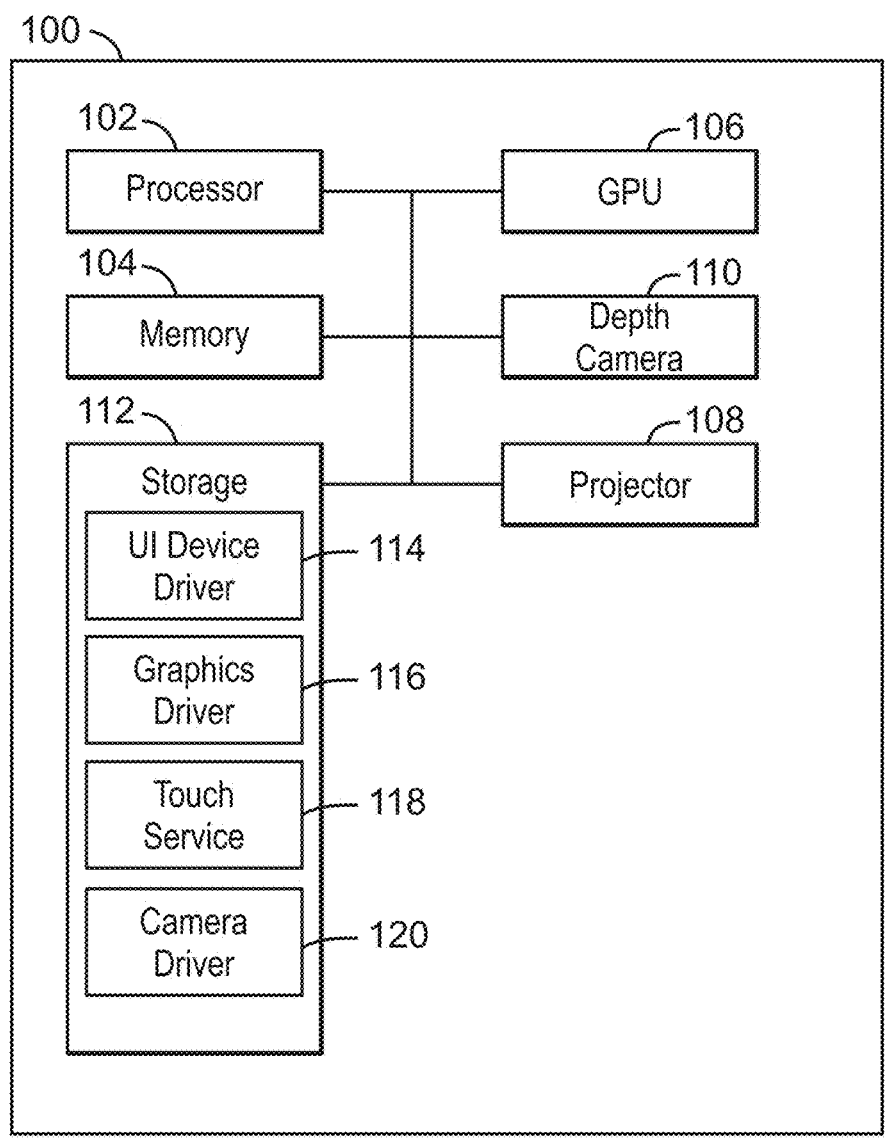
FIG. 1 is a block diagram of an example computing device with a projection-based user interface.

FIG. 1 is a block diagram of an example computing device with a projection-based user interface. The computing device 100 may be, for example, a smart phone, laptop computer, ultrabook, desktop computer, or tablet computer, among others. The computing device 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The processor 102 may be implemented as Complex Instruction Set Computer (CISC) or Reduced Instruction Set Computer (RISC) processors, x86 Instruction set compatible processors, multi-core, or any other microprocessor or central processing unit (CPU). In some embodiments, the processor 102 includes dual-core processor(s), dual-core mobile processor(s), or the like.

The memory device 104 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The memory device 104 can be used to store data and computer-readable instructions that, when executed by the processor, direct the processor to perform various operations in accordance with embodiments described herein.

The computing device 100 may also include a graphics processor 106 that processes computer generated graphics. The graphics processor 106 is configured to process memory related to the generation of graphics to be sent to a projector 108. The projector 108 may be configured to project the image onto a surface such as a tabletop, a projection screen, a wall, and others.

The computing device 100 also includes a depth camera 110 configured to monitor the image projected onto the surface by the projector 108. The depth camera 110 may be configured to capture color images and depth data. For example, the depth data may be a depth for each pixel in the color image captured by the depth camera.

The computing device 100 may also include a storage device 112. The storage device 112 may be a non-transitory, computer-readable medium that stores code that can be accessed by the processor 102. For example, the computer-readable storage device 112 can be non-volatile data storage device such as a hard drive, an optical drive, a flash drive, an array of drives, or any combinations thereof. The storage device 112 can also be a logic unit, such as an Application Specific Integrated Circuit (ASIC), a Field Programmable Gate Array (FPGA), for example.

The storage device 112 can store any number of software programs for operating the computing device 100, including an operating system (OS), user software applications, device drivers, and others. Among other components, the storage device can include a UI device driver 114, a graphics driver 116, a touch service 118, and a depth camera driver 120. The UI device driver 114 is configured to register a virtual touch screen device with the operating system. This registration process can performed during the booting up of the device. In some examples, the UI device driver complies with the USB-HID class specification.

The graphics driver 116 controls the GPU 106 to, among other things, generate a calibration image to enable calibration of the virtual touch screen device. The calibration process generates a mapping between projector display coordinates and the depth camera images coordinates. The components of the GPU 106 that control image projection and calibration may be graphics extensions, e.g. plug-ins, that are added onto the basic graphics driver.

The depth camera driver communicates with the depth camera and enables the touch service to obtain color image data and depth data from the depth camera. The touch service 118 reads the data from the depth camera 110 and processes each input frame to detect user interactions with the projections surface. For example, a user's finger may be detected and the depth and X-Y position of the user's finger may be compared with the calibration mapping to determine whether a user is attempting to interact with the projected image, such as by pressing a button. Touch events detected by the touch service are injected into the operating system by notifying the UI device driver 114 with necessary information such as a touch pointer identifier, a normalized touch location, a touch action state, and others.

The calibration process may be continuous or discontinuous. In a discontinuous calibration process, the touch service signals the graphics driver to stop rendering the current content and instead display a calibration pattern. The touch the service attempts to compute the calibration information, i.e. the mappings between projector display coordinates and the depth camera images coordinates for the known points. If the mapping for all the known points is established the service signals the graphics driver to start rendering the normal contents. The discontinuous calibration process may be configured to be performed on a periodic basic, in response to a user request for calibration, or in response to a determination that the calibration is inaccurate, for example. In some examples, recalibration may be performed in response to movement of the computing system or the projection surface. Examples of a discontinuous calibration process are described further below in relation to FIG. 4.

In a continuous calibration process, the graphics driver 116 inserts an array of content-aware watermarks into the operating system's display output before projection. The watermark images are generated as appropriate for the current content, so that they are invisible or highly unobtrusive to the user. For example, the watermarks may generated using a colors that are slightly different than the content that they overlap. For every frame displayed by the projector, the depth camera captures an RGB image of the entire OS display output and then processes the image to detect the watermarks. The watermark displacement in the RGB image is used to determine the orientation of the projection surface relative to the 3D camera's depth space. In this way, the display of normal operating system display contents is not interrupted by the calibration process. Examples of a continuous calibration process are described further below in relation to FIG. 5.

The block diagram of FIG. 1 is not intended to indicate that the computing device 100 is to include all of the components shown in FIG. 1. Rather, the computing system 100 can include fewer or additional components not shown in FIG. 1, depending on the details of the specific implementation. For example, the computing device 100 may also include a network interface controller (NIC) configured to connect the computing device 100 to a network and/or a memory controller hub that handles communications between the processor 102, memory 104, graphics processor 106, and other components. Additionally, the computing device 100 may include or be coupled to additional user interface devices, such as keyboard, a mouse, Input/Output (I/O) devices, displays, and others. Furthermore, any of the functionalities of the CPU 102, the graphics processor 106 may be partially, or entirely, implemented in hardware and/or in a processor. For example, the functionality may be implemented in any combination of Application Specific Integrated Circuit (ASICs), Field Programmable Gate Array (FPGAs), logic circuits, and the like.

Figure 2:
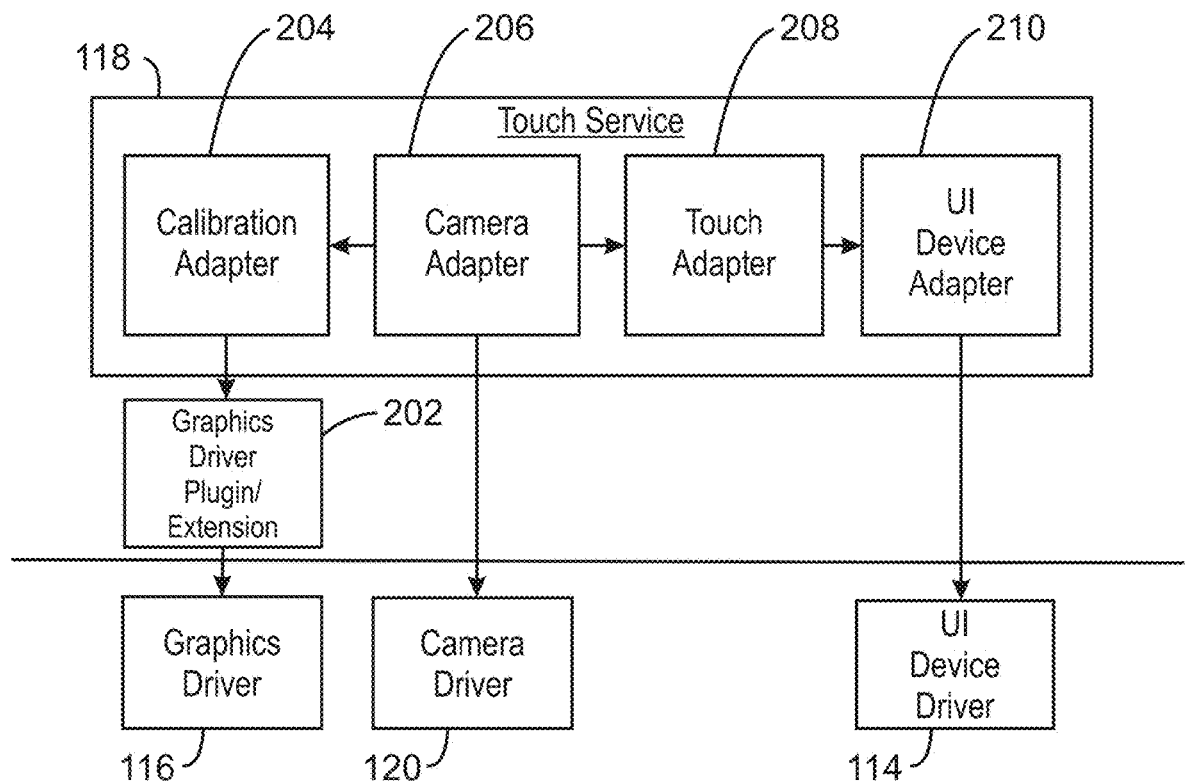
FIG. 2 is an example projected-computing touch system framework for implementing a virtual touch screen device.

FIG. 2 is an example projected-computing touch system framework for implementing a virtual touch screen device. The framework 200 is a system-level software stack that provides a virtual touch screen device for projection display based systems. As mentioned above, the framework 200 includes the touch service 118, the depth camera driver 120, the UI device driver 114, and the graphics driver 116. Additionally, the framework 200 can also include graphics driver extensions 212 that are specific extensions applicable to the operation of the virtual touch screen device. The graphics driver extensions 212 may be implemented as a plug-in. In some examples, the graphics driver 116 may have the capabilities described herein with regard to the graphics driver extensions 212, and the graphics driver extensions 212 may be eliminated.

In the example shown in FIG. 2, the touch service may include a number of adapter modules, including a calibration adapter 204, a camera adapter 120, a touch adapter 208, and a UI device adapter 210. The calibration adapter 204 is configured to handle communication with the graphics driver 116 and the graphics driver extensions 202 to render the calibration pattern and calculate the mapping between the depth camera coordinates and the projection coordinates. The camera adapter 206 is configured to handle communication with the camera driver 120 to capture depth and color image frames for use in the calibration process and touch detection process.

The touch adapter 208 is configured to handle touch detection and compute touch attributes. Touch attributes can include location, ID, status, and others. Location refers to the X and Y position where the touch event occurred. The X and Y locations are within bounds of the operating system display properties, for example, 1280 pixels by 720 pixels. ID refers to an identifier assigned to the finger making the touch gesture. The ID should be kept same for the entire duration the finger is in contact with the surface. Status can be TOUCH_DOWN or TOUCH_UP, which described whether the finger is still in contact with the surface or has the finger lost contact with the surface. The UI device adapter 210 is responsible for communicating with the UI device driver 114 to notify and inject touch events within the operating system.

Figure 3:
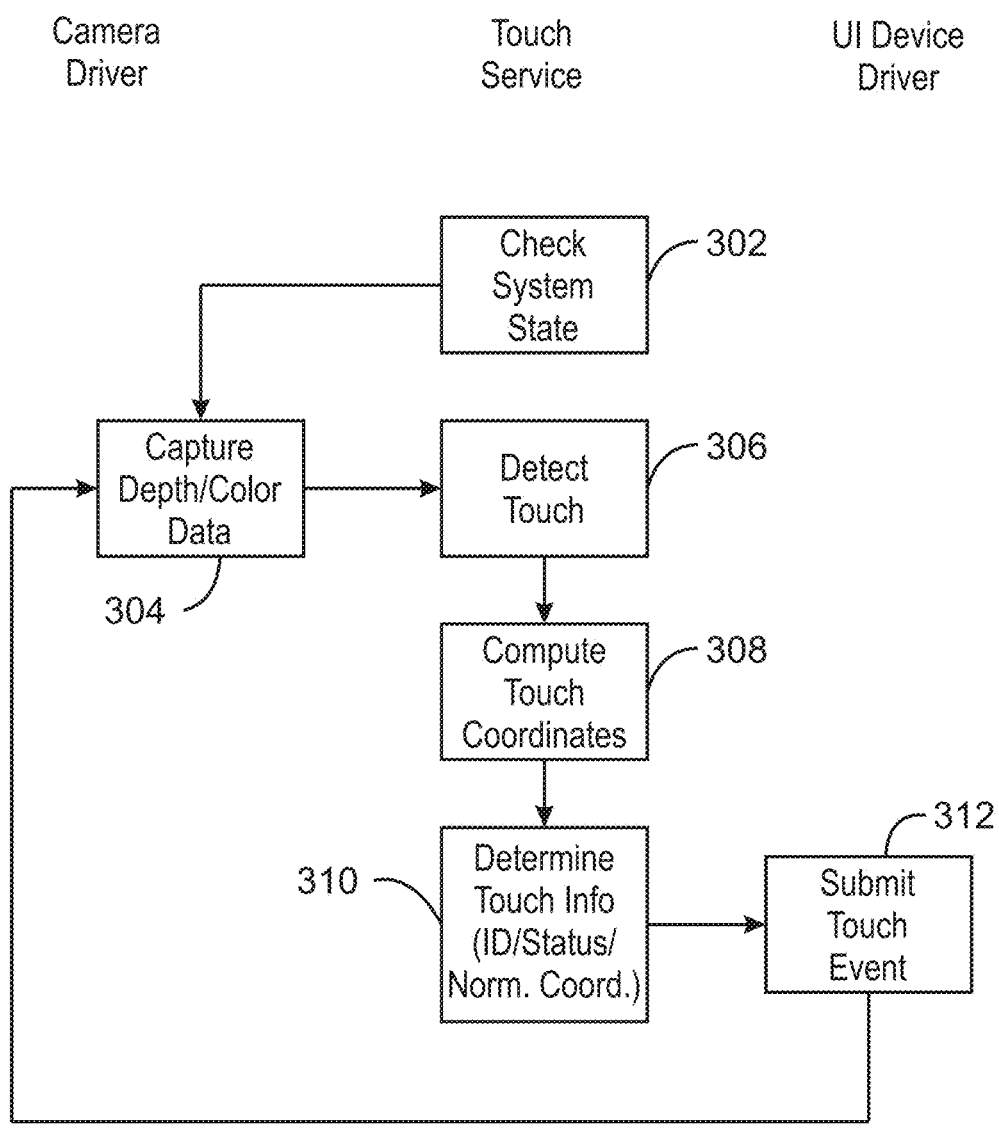
FIG. 3 is a process flow diagram of an example method of operating a virtual touch screen device to detect touch-based user input.

FIG. 3 is a process flow diagram of an example method of operating a virtual touch screen device to detect touch-based user input. The method 300 may be practiced once the system has been calibrated. Examples of system calibration are described further below in relation to FIGS. 4-7. The method may begin at block 302.

At block 302, the touch service checks the system state to determine whether the touch-based user interface is calibrated for the current operating conditions. If the virtual touch screen device is calibrated, the process advances to block 304.

At block 304, the camera driver obtains image data and depth data from the depth camera. The image data and depth data are sent to the touch service, and the process flow advances to block 306.

At block 306, the touch service detects touches based on the image and depth data. The touch service uses the depth information to determine whether there is a hand or fingertip touching the projection surface. Each fingertip touching the projection surface can be registered as a different touch event.

At block 308, the touch service computes touch coordinates for each fingertip touching the projection surface, using the calibration map. The touch coordinates are determined by mapping the fingertip locations in the depth camera coordinates to the corresponding locations in the display coordinates.

At block 310, the touch service may determine additional attributes of the touch event. For example, the touch service may determine a touch status of the touch event, such as whether the touch event is a touch down event or a touch up event. The initiation of the touch may be referred to a "touch down" event, while the release of a touch may be referred to a "touch up" event.

The additional attributes can also include a touch identifier, which relates touch events detected in the current image frame with previous touch events from previous image frames. If a particular touch event represents the first time the fingertip is touching the surface, a new identifier is assigned. Otherwise, if the touch event represents the same fingertip continuing the touch event between successive camera frames, the same identifier is assigned, which enables the operating system to translate the touch event to a gesture such as a swipe, drag, or scroll, for example.

The additional attributes can also include normalized touch coordinates. The normalized touch coordinates are computed by normalizing the touch coordinates computed at block 308 to the display resolution space as specified in the USB-HID standards for the UI device driver.

At block 312, touch events are submitted to the operating system. To submit the touch events, the touch service first submits the touch events, including all of the touch event attributes, to the UI device driver. In some examples, the touch service stores the touch events in a HID report data structure, which is submitted to the UI device driver. The UI device driver then queues the touch event within the operating system, which notifies all the top level applications, user interaction screens, and windows regarding the touch event.

The process flow then advances from block 312 to block 304, and the process repeats. The touch service continuously reads the depth camera data from the camera driver and submits the detected touch events and attributes to the operating system. The method 300 may continue for as long as the computer system is powered on and the virtual touch screen device is calibrated. In some examples, the virtual touch screen device may be recalibrated periodically or in response to movement of the computing system or the projection surface. In discontinuous calibration, the method 300 may be interrupted by the calibration process and resume after the calibration process is complete. An example of discontinuous calibration is described below in relation to FIG. 4. In continuous calibration, the method 300 may be performed in parallel with the calibration process. An example of continuous calibration is described below in relation to FIG. 5.

The method 300 should not be interpreted as meaning that the blocks are necessarily performed in the order shown. Furthermore, fewer or greater actions can be included in the method 300 depending on the design considerations of a particular implementation.

Figure 4:
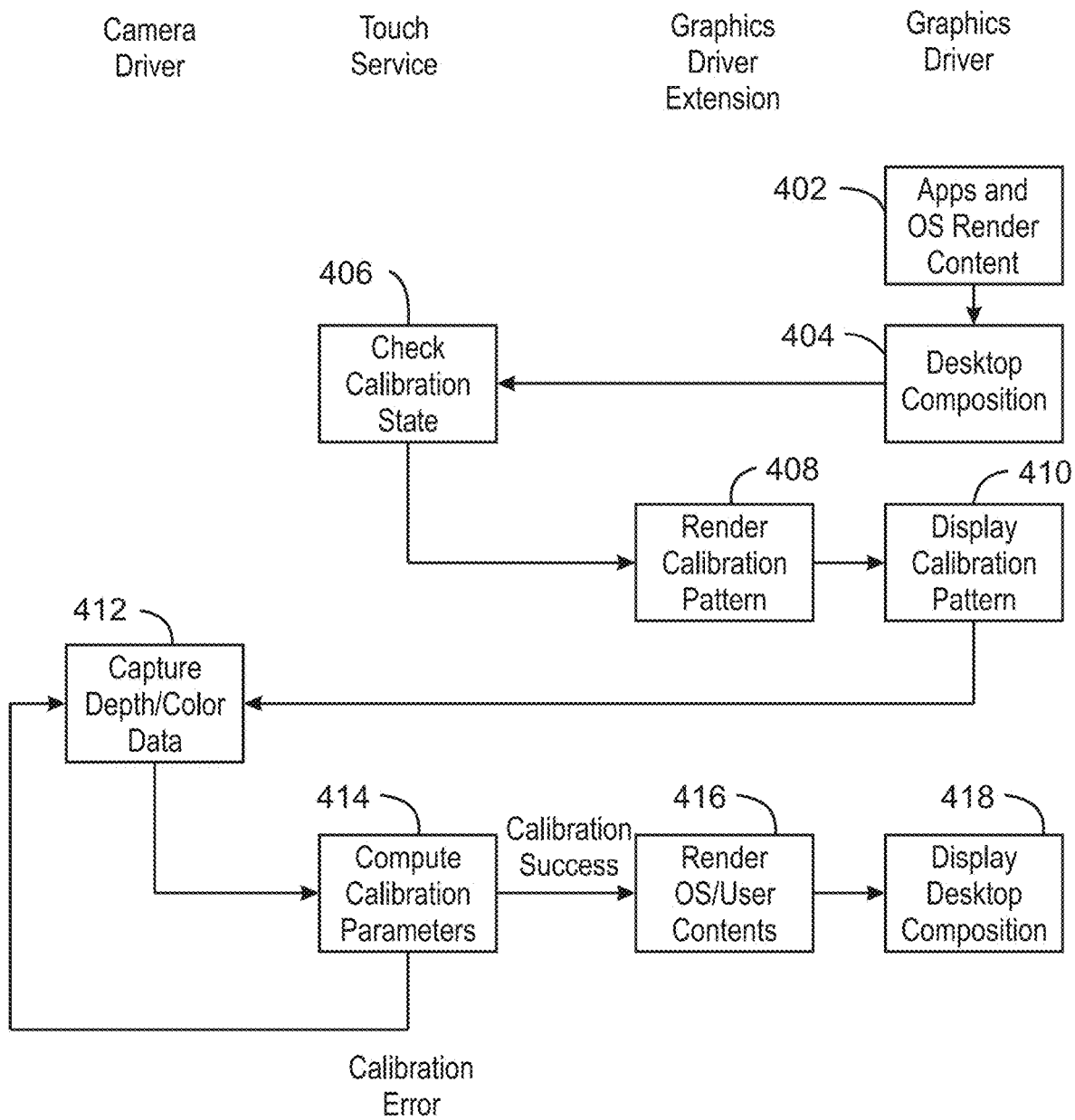
FIG. 4 is a process flow diagram of an example method of calibrating a virtual touch screen device.

FIG. 4 is a process flow diagram of an example method of calibrating a virtual touch screen device. The method 400 describes an example of a discontinuous calibration technique that may be used with the virtual touch screen device. The method may begin at block 402.

At block 402, the operating system application programs render content via the graphics drivers. The content describes the desktop composition, including all visible desktop icons, windows, and the like.

At block 404, the graphics driver generates the desktop composition based on the content provided by the operating system.

At block 406, the touch service checks the state of the virtual touch screen device by determining whether the virtual touch screen device has been calibrated. If the virtual touch screen device has not be previously calibrated, the touch service notifies the graphics driver extension to replace the current display contents with the calibration pattern, and the process flow advances to block 408.

At block 408, the graphics extension renders a calibration pattern and sends the calibration pattern to the graphics driver. The calibration pattern may be any suitable pattern such as a checkerboard pattern or others. The calibration pattern may cover the full extent of the display area.

At block 410, the graphics driver load the calibration pattern into the display buffer and displays the calibration pattern. At this time, the projector is now displaying the calibration pattern loaded in the updated display buffer.

At block 412, the camera driver captures depth and color data from the depth camera and provides the data to the touch service. The depth and color data may include a depth frame and a color frame.

At block 414, the touch service computes the calibration parameters based on a comparison of the depth data and color data received from the camera driver. The calibration parameters provide a mapping between the projector display coordinates and the depth camera images coordinates. If the calibration is unsuccessful, the process flow returns to block 412 and the process repeats with new depth and color data. The touch service continuously reads the depth camera's color frame and depth frame until the calibration succeeds. If the calibration is successful, the touch service signals the graphics driver extension to revert to displaying the normal operating system contents, and the process flow advances to block 416

At block 416, the graphics driver extension removes the calibration pattern from the display buffer and stops updating the display buffer contents. The process flow then advances to block 418.

At block 418, the graphics driver displays the desktop composition. At this time, the projector is now displaying the user contents generated by the operating system and the virtual touch screen device is able to detect touch events as described above in relation to FIG. 3.

If at block 406, if the virtual touch screen device has be previously calibrated, the process flow advances directly to block 418, the calibration process is bypassed, and the desktop composition is displayed by the graphics driver.

The method 400 should not be interpreted as meaning that the blocks are necessarily performed in the order shown. Furthermore, fewer or greater actions can be included in the method 400 depending on the design considerations of a particular implementation. For example, the processes described as being performed by the graphics driver extension may be performed by the graphics driver itself.

Figure 5:
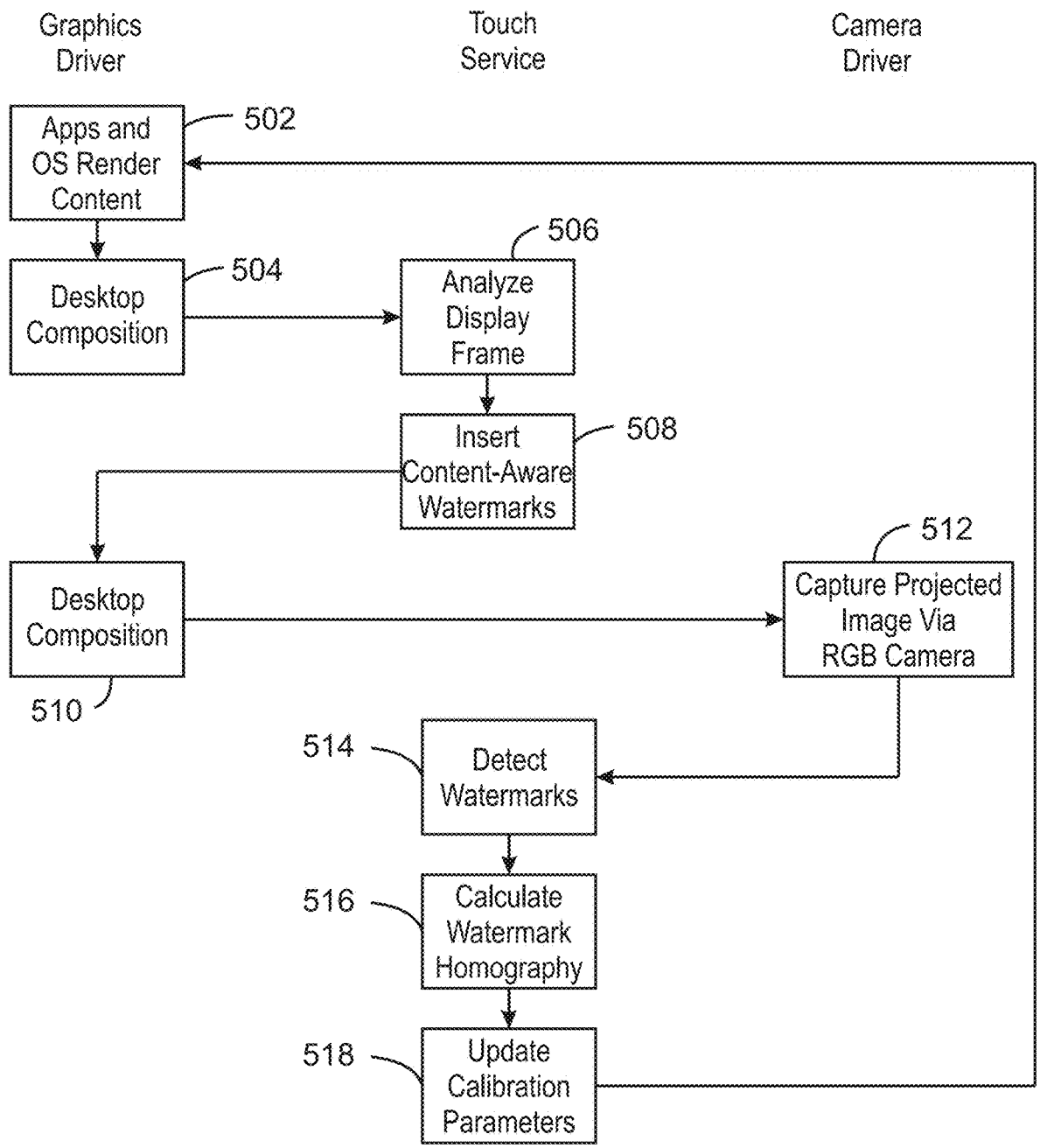
FIG. 5 is a process flow diagram of an example method of calibrating a virtual touch screen device.

FIG. 5 is a process flow diagram of an example method of calibrating a virtual touch screen device. The method 500 describes an example of a continuous calibration technique that may be used with the virtual touch screen device. Throughout the following description, reference will be made to FIGS. 6A-C, which illustrate aspects of the present techniques. The method may begin at block 502.

At block 502, the operating system and application programs render content via the graphics drivers. The content describes the desktop composition, including all visible desktop icons, windows, and the like. An example desktop composition is shown in FIG. 6A as item 602.

At block 504, the graphics driver generates the desktop composition based on the content provided by the operating system. The graphics driver then sends the desktop composition to the touch service, and the process flow advances to block 506.

At block 506, the touch service analyzes the desktop composition to determine how to display the watermarks. The watermarks are configured to be unobtrusive, or even invisible, to the user. Thus, the watermark attributes, such as color and brightness, depend on the attributes of the desktop image overlapped by the watermarks.

At block 508, the touch service inserts a calibration pattern into the desktop image based on the analysis performed at block 506. The calibration pattern can include an array of watermarks distributed throughout the display area or around the perimeter of the display area. An example watermark array is shown in FIG. 6A as item 604. The image with the watermarks inserted is referred to herein as the composite image. After the composite image is generated, the touch service sends the composite image to the graphics driver, and the process advances to block 510.

Figure 6B:
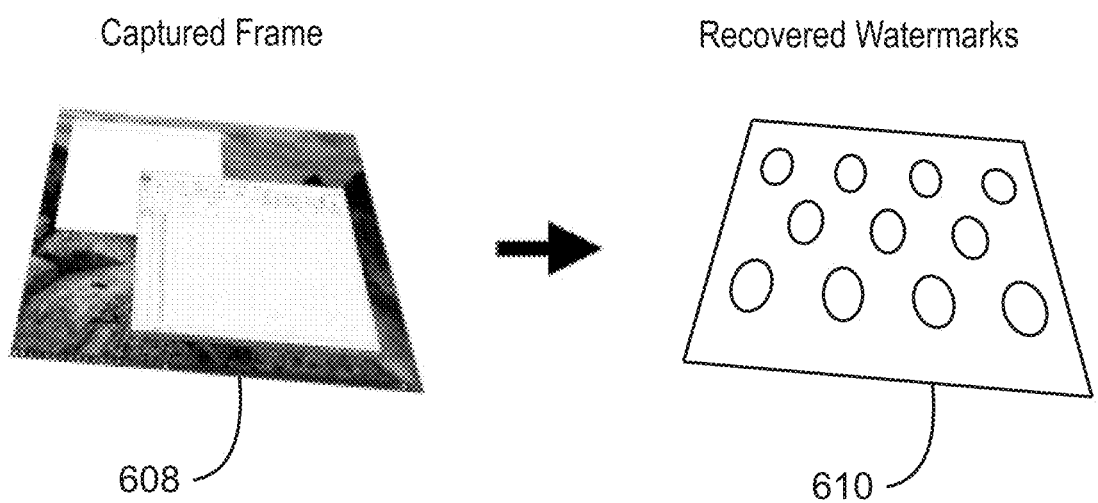

At block 510, the graphics driver displays the composite image. At this time, the projector is now displaying the composite image on the projection surface. An example composite image is shown in FIG. 6A as item 606. As shown in FIG. 6A, the watermark array can be combined with the composite image in such a way as to make the watermark array unnoticeable to the user. For example, the color intensity difference between any portion of the watermark and the corresponding portion of the desktop composition may be small enough to be unnoticeable to the user, but detectable by the depth camera. An example composite image as projected is shown in FIG. 6B as item 608. The composite image as projected may be distorted due to the distance and angle of the projector relative to projection surface. The composite image as projected may be also be distorted due to the shape of the projection surface.

At block 512, the camera driver captures the color image and provides the image frame data to the touch service.

At block 514, the touch service detects and extracts the water marks. An example representation of the extracted watermark array is shown in FIG. 6B as item 610.

Figure 6C:
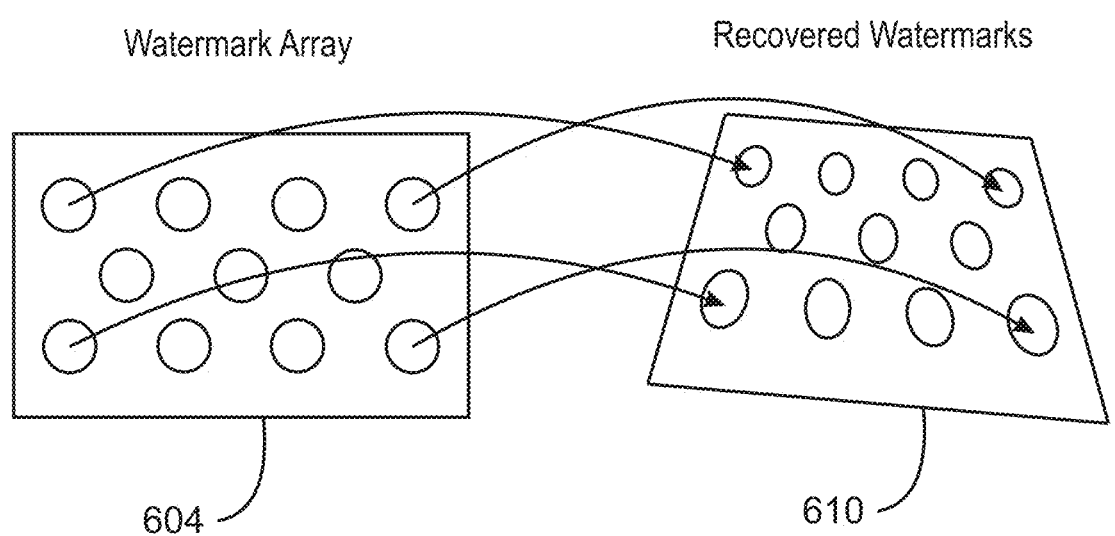

At block 516, the touch service calculates the water mark homography. Watermark homography refers to the distortion in the shape and location of the watermarks due to the position, angle, and shape of the projection surface relative to the projector. Accordingly, the calibration parameters can be determined through analysis of the watermark homography. As represented in FIG. 6C, the calculation of the water mark homography involves comparing the positions of the extracted watermarks 610, with the positions of the watermark array 604 generated by the touch service. The mapping between the projector display coordinates and the depth camera image coordinates is determined based on this comparison.

At block 518, the calibration parameters are updated based on the analysis performed at block 516. The calibration parameters provide a mapping between the projector display coordinates and the depth camera image coordinates. The mapping can then be used by the touch service to detect touch events as described above in relation to FIG. 3. The process flow then returns to block 502.

The process described above enables calibration information to be updated every frame, for example, every 16 milliseconds on a 60 Frames Per Second (FPS) display. This enables the touch service to maintain synchronization with the projected display even as the user moves or resizes it.

The method 500 should not be interpreted as meaning that the blocks are necessarily performed in the order shown. Furthermore, fewer or greater actions can be included in the method 500 depending on the design considerations of a particular implementation. For example, the processes described as being performed by the graphics driver extension may be performed by the graphics driver itself.

FIGS. 6A-C are example illustrations of a method of performing continuous calibration of a virtual touch screen device. FIGS. 6A-C are described further above in relation to FIG. 5.

Figure 7:
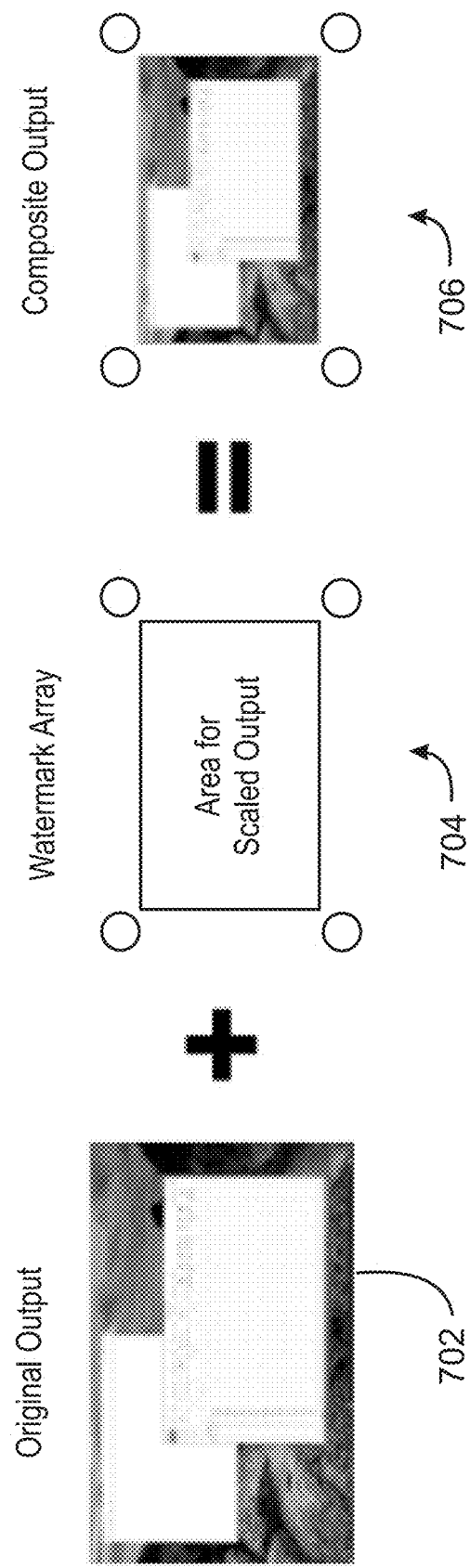
FIG. 7 is an example illustration of another watermark array that can be used to perform continuous calibration of a virtual touch screen device.

FIG. 7 is an illustration of another watermark array that can be used to perform continuous calibration of a virtual touch screen device. The original desktop composition generated by the graphics driver is shown as item 702. The watermark array is shown as item 704. The composite image is shown as item 706. In this example, the original desktop composition is scaled down to a smaller size so that the desktop composition covers an area smaller than the overall projection area, and the watermark array is positioned around the border of the overall projection area outside of the desktop composition. In this way, the watermarks will be unobtrusive to the user even if they are visible. The method 500 of FIG. 5 may be performed in the same manner as described above with the watermark array 704 shown in FIG. 7.

EXAMPLES

Example 1 is a computing device with a virtual touch screen. The computing device includes a projector to project a user interface image, a depth camera to detect objects in a vicinity of the user interface image, and a touch service that receives image data from the depth camera and analyzes the image data to generate touch event data. The computing device also includes a User Input (UI) device driver that receives the touch event data from the touch service and reports the touch event data to an operating system of the computing device. The touch service and UI device driver are system level software that is operable prior to a user logging onto the computing device.

Example 2 includes the computing device of example 1, including or excluding optional features. In this example, the operating system is operable to accept touch event data during a first time system setup, a login window, and lock screen.

Example 3 includes the computing device of any one of examples 1 to 2, including or excluding optional features. In this example, the UI device driver is registered with the operating system during boot up of the computing device.

Example 4 includes the computing device of any one of examples 1 to 3, including or excluding optional features. In this example, the UI device driver complies with the Universal Serial Bus-Human Interface Device (USB-HID) class specification.

Example 5 includes the computing device of any one of examples 1 to 4, including or excluding optional features. In this example, the computing device includes a graphics driver to override rendering of the user interface image with a calibration pattern prior to a user being logged onto the computing device.

Example 6 includes the computing device of any one of examples 1 to 5, including or excluding optional features. In this example, the touch service performs a calibration process to generate a map that maps coordinates of the image data received by the depth camera to coordinates of the user interface image projected by the projector.

Example 7 includes the computing device of any one of examples 1 to 6, including or excluding optional features. In this example, the touch service performs the calibration process by overriding the user interface image with a calibration pattern.

Example 8 includes the computing device of any one of examples 1 to 7, including or excluding optional features. In this example, the touch service performs the calibration process by inserting a watermark array into the user interface image, and the map is updated at a same rate as a frame rate of the projector. Optionally, the watermark array overlaps content of the user interface image. Optionally, content of the user interface image is scaled down and the watermark array is positioned around the outside of the content.

Example 9 is a method of operating a computing device with a virtual touch screen. The method includes projecting a user interface image onto a surface, receiving image data from a depth camera and analyzing the image data to generate touch event data. The method also includes sending the touch event data to a User Input (UI) device driver that reports the touch event data to an operating system of the computing device. The UI device driver is a system level device driver that is operable prior to a user logging onto the computing device.

Example 10 includes the method of example 9, including or excluding optional features. In this example, the method includes reporting the touch event data to the operating system during a first time system setup, a login window, and lock screen.

Example 11 includes the method of any one of examples 9 to 10, including or excluding optional features. In this example, the method includes registering the UI device driver with the operating system during boot up of the computing device.

Example 12 includes the method of any one of examples 9 to 11, including or excluding optional features. In this example, the UI device driver complies with the Universal Serial Bus-Human Interface Device (USB-HID) class specification.

Example 13 includes the method of any one of examples 9 to 12, including or excluding optional features. In this example, the method includes overriding rendering of the user interface image with a calibration pattern prior to a user being logged onto the computing device.

Example 14 includes the method of any one of examples 9 to 13, including or excluding optional features. In this example, the method includes performing a calibration process to generate a map that maps coordinates of the image data to coordinates of the user interface image.

Example 15 includes the method of any one of examples 9 to 14, including or excluding optional features. In this example, performing the calibration process comprises overriding the user interface image with a calibration pattern.

Example 16 includes the method of any one of examples 9 to 15, including or excluding optional features. In this example, performing the calibration process comprises inserting a watermark array into the user interface image, and updating the map at for each frame of the user interface image. Optionally, inserting the watermark array comprises overlapping the watermark array with contents of the user interface image. Optionally, inserting the watermark array comprises scaling down content of the user interface image and positioning the watermark array outside a perimeter of the content.

Example 17 is a tangible, non-transitory, computer-readable medium comprising instructions that, when executed by a processor, direct the processor to operate a computing device with a virtual touch screen. The computer-readable medium includes instructions that direct the processor to project a user interface image onto a surface, receive image data from a depth camera, and analyze the image data to generate touch event data. The computer-readable medium also includes instructions that direct the processor to send the touch event data to a User Input (UI) device driver that reports the touch event data to an operating system of the computing device. The UI device driver is a system level device driver that is operable prior to a user logging onto the computing device.

Example 18 includes the computer-readable medium of example 17, including or excluding optional features. In this example, the instructions direct the processor to report the touch event data to the operating system during a first time system setup, a login window, and lock screen.

Example 19 includes the computer-readable medium of any one of examples 17 to 18, including or excluding optional features. In this example, the instructions direct the processor to register the UI device driver with the operating system during boot up of the computing device.

Example 20 includes the computer-readable medium of any one of examples 17 to 19, including or excluding optional features. In this example, the UI device driver complies with the Universal Serial Bus-Human Interface Device (USB-HID) class specification.

Example 21 includes the computer-readable medium of any one of examples 17 to 20, including or excluding optional features. In this example, the instructions direct the processor to override rendering of the user interface image with a calibration pattern prior to a user being logged onto the computing device.

Example 22 includes the computer-readable medium of any one of examples 17 to 21, including or excluding optional features. In this example, the instructions direct the processor to perform a calibration process to generate a map that maps coordinates of the image data to coordinates of the user interface image.

Example 23 includes the computer-readable medium of any one of examples 17 to 22, including or excluding optional features. In this example, the instructions direct the processor to perform the calibration process by overriding the user interface image with a calibration pattern.

Example 24 includes the computer-readable medium of any one of examples 17 to 23, including or excluding optional features. In this example, the instructions direct the processor to perform the calibration process by inserting a watermark array into the user interface image, and updating the map for each frame of the user interface image. Optionally, inserting the watermark array comprises overlapping the watermark array with contents of the user interface image. Optionally, inserting the watermark array comprises scaling down content of the user interface image and positioning the watermark array outside a perimeter of the content.

Example 25 is an apparatus with a virtual touch screen device. The apparatus includes means for projecting a user interface image onto a surface, means for receiving image data from a depth camera and analyzing the image data to generate touch event data, and means for sending the touch event data to a User Input (UI) device driver that reports the touch event data to an operating system of the computing device. The UI device driver is a system level device driver that is operable prior to a user logging onto the computing device.

Example 26 includes the apparatus of example 25, including or excluding optional features. In this example, the UI device driver reports the touch event data to the operating system during a first time system setup, a login window, and lock screen.

Example 27 includes the apparatus of any one of examples 25 to 26, including or excluding optional features. In this example, the apparatus includes means for registering the UI device driver with the operating system during boot up of the computing device.

Example 28 includes the apparatus of any one of examples 25 to 27, including or excluding optional features. In this example, the UI device driver complies with the Universal Serial Bus-Human Interface Device (USB-HID) class specification.

Example 29 includes the apparatus of any one of examples 25 to 28, including or excluding optional features. In this example, the apparatus includes means for overriding the rendering of the user interface image with a calibration pattern prior to a user being logged onto the computing device.

Example 30 includes the apparatus of any one of examples 25 to 29, including or excluding optional features. In this example, the apparatus includes means for performing a calibration process to generate a map that maps coordinates of the image data to coordinates of the user interface image.

Example 31 includes the apparatus of any one of examples 25 to 30, including or excluding optional features. In this example, the means for performing the calibration process comprise means for overriding the user interface image with a calibration pattern.

Example 32 includes the apparatus of any one of examples 25 to 31, including or excluding optional features. In this example, the means for performing the calibration process comprise means for inserting a watermark array into the user interface image and updating the map for each frame rate of the user interface image. Optionally, the means for inserting the watermark array overlaps the watermark array with contents of the user interface image. Optionally, the means for inserting the watermark array scales down content of the user interface image and positions the watermark array outside a perimeter of the content.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A computing device with a virtual touch screen, comprising:
    a projector configured to project a user interface image;
    a depth camera configured to detect objects in a vicinity of the user interface image;
    a memory including a touch service and a User Input (UI) device driver; and
    an electronic processor,
    wherein, when executing the touch service, the electronic processor is configured to:
        receive image data from the depth camera,
        perform a calibration process to generate a map that maps coordinates of the image data received by the depth camera to coordinates of the user interface image projected by the projector based on an image projected by the projector and captured by the depth camera, wherein the touch service performs the calibration process by inserting a watermark array into the user interface image, wherein to generate the map comprises to compare a position and shape of the watermark array projected by the projector with the position and shape of the watermark array captured by the depth camera, and
        analyze the image data to generate touch event data,
    wherein, when executing the UI device driver, the electronic processor is configured to:
        receive the touch event data generated by the touch service, and
        report the touch event data to an operating system of the computing device, and
    wherein the touch service and UI device driver comprise system level software that is executable by the electronic processor prior to a user logging onto the computing device,
    wherein, when the electronic processor executes the touch service, the electronic processor is further configured to update the map at a same rate as a frame rate of the projector, and
    wherein, when the electronic processor executes the touch service, the electronic processor is further configured to:
        scale down content of the user interface image, and
        position the watermark array around the outside of the content.

2. The computing device of claim 1, wherein the operating system is operable to accept the touch event data during a first time system setup, a login window, and lock screen.

3. The computing device of claim 1, wherein the UI device driver is registered with the operating system during boot up of the computing device.

4. The computing device of claim 1, wherein the UI device driver complies with the Universal Serial Bus-Human Interface Device (USB-HID) class specification.

5. The computing device of claim 1, wherein the memory further includes a graphics driver, and
    wherein, when the electronic processor executes the graphics driver, the electronic processor is configured to override rendering of the user interface image with a calibration pattern prior to the user being logged onto the computing device.

6. The computing device of claim 1, wherein, when the electronic processor executes the touch service, the electronic processor is further configured to perform the calibration process by overriding the user interface image with a calibration pattern.

7. The computing device of claim 1, wherein the watermark array overlaps content of the user interface image.

8. A method of operating a computing device with a virtual touch screen, comprising:
    projecting a user interface image onto a surface;
    receiving image data from a depth camera;
    performing a calibration process to generate a map that maps coordinates of the image data received by the depth camera to coordinates of the projected user interface image based on an image projected by a projector and captured by the depth camera, wherein the calibration process comprises inserting a watermark array into the user interface image, wherein to generate the map comprises to compare a position and shape of the watermark array projected by the projector with the position and shape of the watermark array captured by the depth camera;
    analyzing the image data to generate touch event data; and
    sending the touch event data to a User Input (UI) device driver that reports the touch event data to an operating system of the computing device;
    wherein the UI device driver is a system level device driver that is operable prior to a user logging onto the computing device,
    wherein performing the calibration process comprises updating the map at for each frame of the user interface image, and
    wherein inserting the watermark array comprises scaling down content of the user interface image and positioning the watermark array outside a perimeter of the content.

9. The method of claim 8, comprising reporting the touch event data to the operating system during a first time system setup, a login window, and lock screen.

10. The method of claim 8, comprising registering the UI device driver with the operating system during boot up of the computing device.

11. The method of claim 8, wherein the UI device driver complies with the Universal Serial Bus-Human Interface Device (USB-HID) class specification.

12. The method of claim 8, comprising overriding rendering of the user interface image with a calibration pattern prior to the user being logged onto the computing device.

13. The method of claim 8, wherein performing the calibration process comprises overriding the user interface image with a calibration pattern.

14. The method of claim 8, wherein inserting the watermark array comprises overlapping the watermark array with contents of the user interface image.

15. A tangible, non-transitory, computer-readable medium comprising instructions that, when executed by a processor, direct the processor to operate a computing device with a virtual touch screen, the instructions to direct the processor to:
project a user interface image onto a surface;
receive image data from a depth camera;
perform a calibration process to generate a map that maps coordinates of the image data received by the depth camera to coordinates of the projected user interface image based on an image projected by a projector and captured by the depth camera, wherein the calibration process comprises inserting a watermark array into the user interface image, wherein to generate the map comprises to compare a position and shape of the watermark array projected by the projector with the position and shape of the watermark array captured by the depth camera;
analyze the image data to generate touch event data; and
send the touch event data to a User Input (UI) device driver that reports the touch event data to an operating system of the computing device;
wherein the UI device driver is a system level device driver that is operable prior to a user logging onto the computing device,
wherein performing the calibration process comprises updating the map at for each frame of the user interface image, and
wherein inserting the watermark array comprises scaling down content of the user interface image and positioning the watermark array outside a perimeter of the content.

16. The computer-readable medium of claim 15, wherein the instructions direct the processor to report the touch event data to the operating system during a first time system setup, a login window, and lock screen.

17. The computer-readable medium of claim 15, wherein the instructions direct the processor to register the UI device driver with the operating system during boot up of the computing device.

18. The computer-readable medium of claim 15, wherein the UI device driver complies with the Universal Serial Bus-Human Interface Device (USB-HID) class specification.

19. The computer-readable medium of claim 15, wherein the instructions direct the processor to override rendering of the user interface image with a calibration pattern prior to the user being logged onto the computing device.

* * * * *